United States Patent [19]

Greiner et al.

[11] Patent Number: 5,207,185
[45] Date of Patent: May 4, 1993

[54] EMISSIONS REDUCTION SYSTEM FOR INTERNAL COMBUSTION ENGINES

[76] Inventors: Leonard Greiner, 1310 Logan Ave., #E, Costa Mesa, Calif. 92626; David M. Moard, 1545 S. El Molino, Pasadena, Calif. 91106

[21] Appl. No.: 858,840

[22] Filed: Mar. 27, 1992

[51] Int. Cl.⁵ .............................................. F02B 43/08
[52] U.S. Cl. ................................. 123/3; 123/DIG. 12
[58] Field of Search ............................ 123/3, DIG. 12

[56] References Cited

U.S. PATENT DOCUMENTS 4,066,043  1/1978  Noguchi et al. ........................ 123/3
4,441,461  4/1984  Yoon et al. ................. 123/DIG. 12

Primary Examiner—Noah P. Kamen
Attorney, Agent, or Firm—Albert M. Herzig

[57] ABSTRACT

Apparatus is disclosed herein for reducing engine nitrogen oxide emissions by mixing hydrogen prepared from a portion of engine fuel within a simple burner. The apparatus includes a burner having an internal combustion chamber for receiving either a portion of gaseous fuel or liquid fuel for mixture with air and subsequent ignition by a spark plug. A mixing chamber is included having a series of baffles against which injected air and fuel vapor impinge causing thorough and complete air/fuel blending into a mixture subsequently ignited and burned, and then discharged into the combustion chamber of the engine itself.

10 Claims, 4 Drawing Sheets

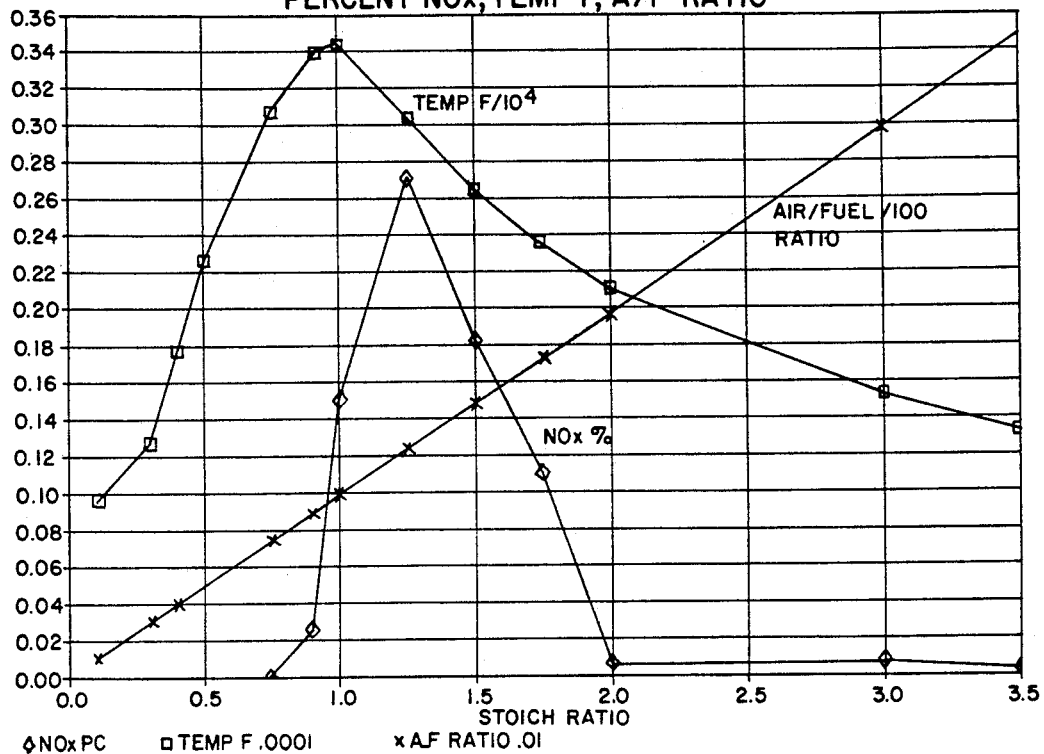
FIG. 3. CH4-AIR REACTION VS STOICH RATIO PERCENT NOx, TEMP F, A/F RATIO
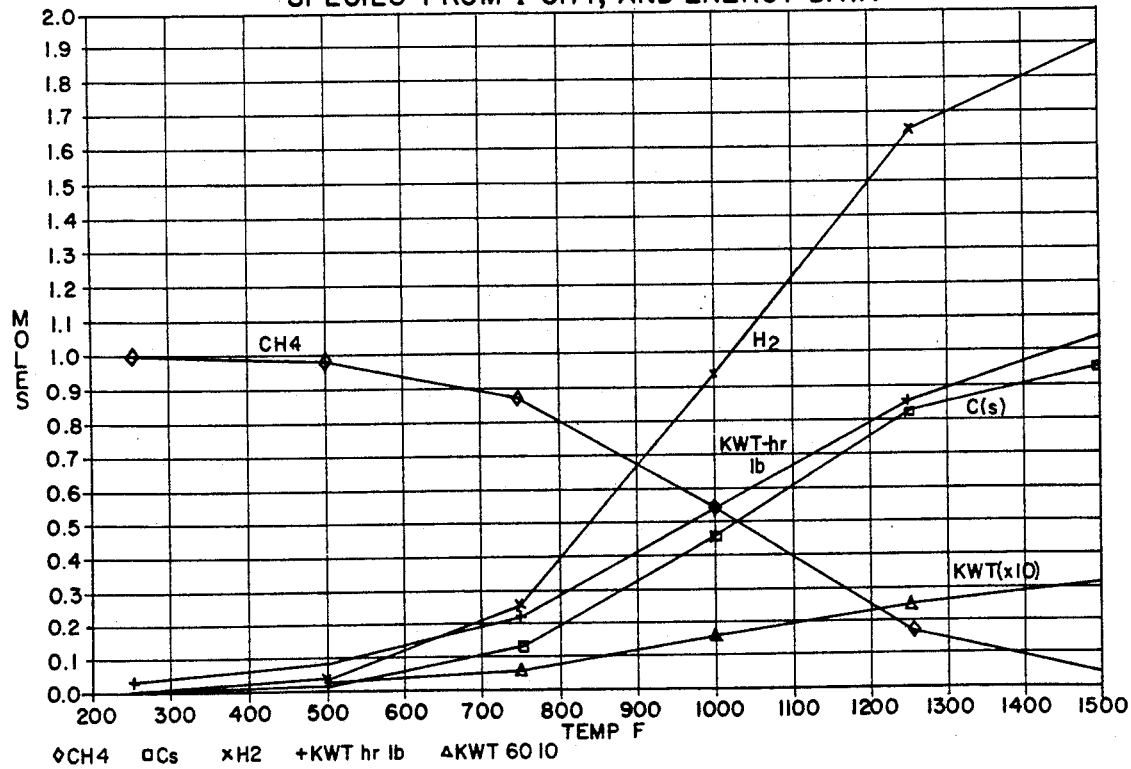
FIG. 4. THERMAL DECOMPOSITION OF METHANE: SPECIES FROM 1 CH4, AND ENERGY DATA

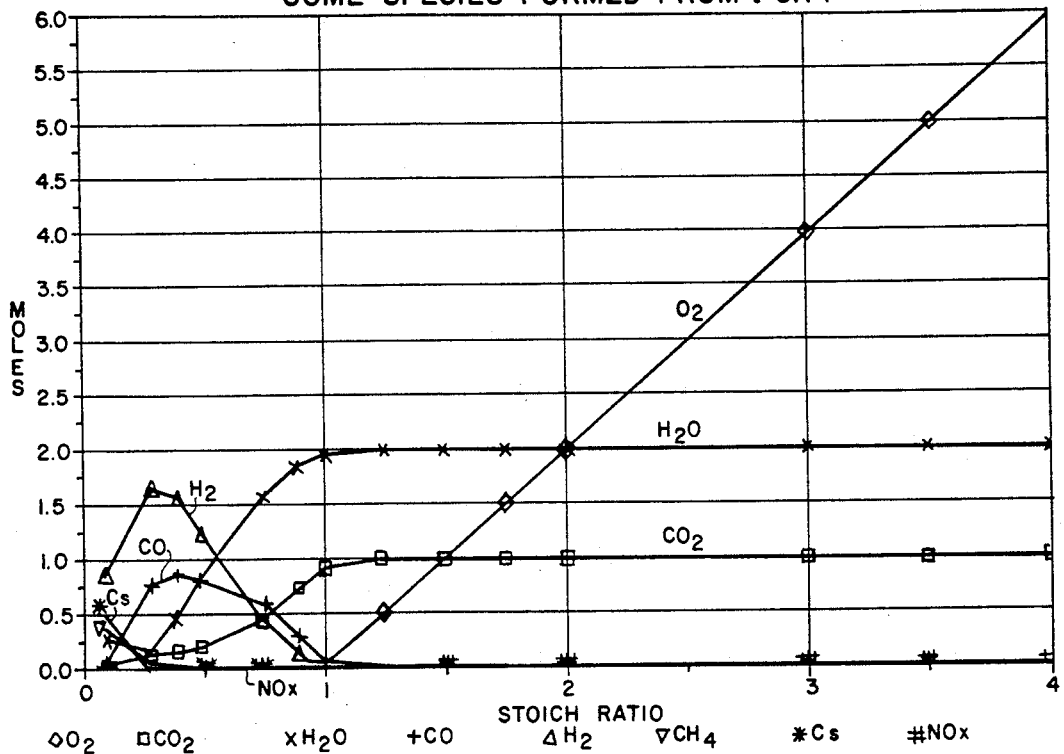
FIG. 5. CH4-AIR REACTION VS STOICH RATIO: SOME SPECIES FORMED FROM 1 CH4
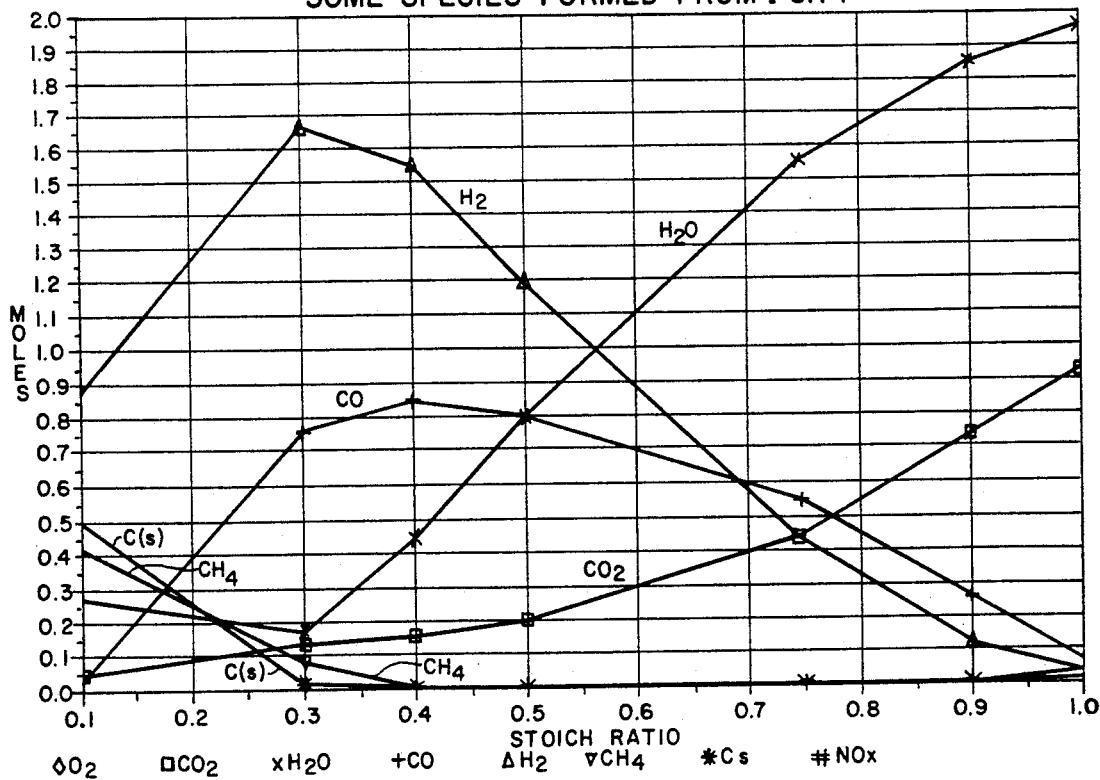
FIG. 6. CH4-AIR REACTION VS LOW STOICH RATIO: SOME SPECIES FORMED FROM 1 CH4

EMISSIONS REDUCTION SYSTEM FOR INTERNAL COMBUSTION ENGINES

BACKGROUND OF THE INVENTION

1. Field of the Invention

The present invention relates to the field of reducing nitrogen oxide emission from internal combustion engines and turbines, and more particularly to a novel means of adding hydrogen prepared by means of a novel burner from a portion or part of the main engine fuel whether it be gaseous or liquid.

2. Brief Description of the Prior Art

It is well known that nitrogen oxides ($NO_x$) form at the high temperatures normally associated with combustion processes and that operating an engine at lean conditions with excess air lowers temperature and, therefore, decreases $NO_x$. However, decades of engine and turbine studies have shown that lean combustion limits for all fuels are above those where $NO_x$ emissions are below specified goals. Natural gas and gasoline are examples where lean combustion has been pushed to its limit and where it has been found that hydrogen addition increases this limit to where $NO_x$ output is acceptably low. However, means to obtain hydrogen for this purpose are beset with problems Problems and difficulties have been encountered when the supply of hydrogen is provided by materials carried in a separate tank which can be extremely heavy and requires pressurization. As examples, methanol, hydrogen or ammonium nitrate can produce hydrogen when added to an engine combustor. However, these add to the fuel and so reduce the volumetric storage capacity which lowers overall performance, and results in complications through use of secondary materials. Hydrogen stored in the pressurized container which holds methane (Hythane) can also be used, but this causes about 0.75 percent reduced engine range for each percent hydrogen used because of its very low energy content on a volumetric basis, and also requires special means to enable safe storage of hydrogen.

A more favorable method to obtain hydrogen is by properly treating a portion of the main engine fuel itself. This does not require storing and using a new expendable and can be accomplished with little or no loss of fuel energy. Hydrogen may be produced from fuels by high-temperature decomposition, such as those listed in Greiner, U.S. Pat. No. 4,350,133. The actual patent discloses a fuel burner and decomposer combination on which hot gases produced from the burner heat a secondary flow of fuel within a heat exchanger to temperatures where it decomposes to form hydrogen. It is intended for use with methanol as fuel, which can uniquely decompose without formation of solid carbon "soot" which can harm the engine process. The burner of the aforementioned patent cannot efficiently combust when fuel rich, where otherwise hydrogen is produced. Hydrogen can also be produced by reacting the fuel with water to produce hydrogen through a "reforming" process. Such a process, however, requires involved catalytic means to bring about the water-fuel reaction, a heat input for its endothermic reaction, stored water or means to obtain it from the engine exhaust, etc. In addition, it often is difficult to obtain rapid and accurate flow response. Because of such factors, the reformer process does not lend itself to an engine process.

The fuel may also be reacted with a deficiency of air to produce hydrogen. Doing so, however, is challenging because the excess fuel is not highly reactive and therefore difficult to involve in the reaction. For this reason, such previous processes relied on catalysts and complex hardware, which tended to make the process virtually unusable. Thus, Houssman, et al, U.S. Pat. No. 4,033,133 teaches the use of special high temperature catalyst coupled with intensive preheat of the reactants to combust fuel with air to produce hydrogen. Such catalytic devices, by their nature, are complex, difficult to control, and require undesirably long start-up times. Thus, they do not lend themselves to an engine process.

Therefore, a long-standing need has existed to provide a novel apparatus and means for accomplishing a technology breakthrough for a simple means of producing hydrogen from fuel in a simple burner without the catalyst or special pressurized hydrogen or related storage means normally considered.

SUMMARY OF THE INVENTION

Accordingly, the above problems and difficulties are obviated by the present invention which provides a novel means and method utilizing a burner for combusting air and hydrocarbons at fuel-rich stoichiometric air/fuel ratios from 0.3 to 1, which includes a burner having a combustion chamber properly coupled to a main source of fuel which includes means for diverting a portion of the main fuel into the burner along with a portion of the main air so that the fuel portion and air portion impinge against a first and second baffle arrangement whereby impingement thoroughly mixes the fuel/air combination preparatory for ignition in the combustion chamber. Ignition means are provided for exhausting the burned gases from the burner into the combustion chamber of an engine. The excellent mixing provided by said impingements results in close to theoretical equilibration of the fuel-rich reaction, despite the low reactivity of the excess fuel.

In one form of the invention, hydrogen gas is produced by employing a portion of methane gas which is mixed with the air by the baffle assembly, and in another form of the invention, liquid fuel, such as gasoline, is vaporized in a heat exchanger in the burner combustor prior to mixture with air in the baffle assembly for subsequent ignition and discharge to the engine combustion compartment. Therefore, it is among the primary objects of the present invention to provide a novel burner apparatus for combusting air and hydrocarbons at fuel-rich stoichiometric air/fuel ratios from 0.3 to 1 which incorporates means to intimately mix the air and fuel vapors prior to injection into a combustion chamber.

Another object of the present invention is to provide a novel burner means having intimate premixing of fuel and a deficiency of air which is achieved by bringing the air and fuel together in a separate chamber where the flow is induced to move back and forth via a series of baffle assemblies preparatory for entering the combustion chamber where ignition of the mixture occurs.

Another object of the present invention is to provide a simple burner apparatus for converting a portion of main engine fuel to hydrogen which is then added to the main fuel flow to the engine so as to permit combustion under conditions where little or reduced nitrogen oxide is produced.

Yet another object is to provide a novel burner apparatus which is a very simple, non-catalytic burner means to produce hydrogen from a portion of the main engine fuel for injection into the main engine combustor with the remainder of the fuel to attain high air/fuel ratios leading to minimal nitrogen oxide formation.

Still a further object of the present invention is to provide a hydrogen generator for use in connection with reducing nitrogen oxide in an engine emission which does not require additives that degrade fuel performance and which burner contributes little to engine complexity.

Yet another object of the present invention is to provide a novel means and apparatus to reduce nitrogen oxides from internal combustion engines and turbines by utilization of a simple hydrogen generator fed by a small portion of main engine fuel whereby the resultant hydrogen produced is to be co-fired in the engine with the remainder of the main fuel.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 3 is a chart pertaining to factors contributing to nitrogen oxide formation involving reaction between methane ($CH_4$) and air ($2+4N_2$);

FIG. 4 is a chart similar to the chart of FIG. 3 involving the decomposition of methane at various temperatures based on equilibrium species per mole of methane;

FIG. 5 is a chart presenting further information on major species at equilibrium versus air/fuel stoichiometric ratio;

FIG. 6 is a chart which amplifies the section of FIG. 5 below a ratio of 1; and

DESCRIPTION OF THE PREFERRED EMBODIMENT

Figure 1:
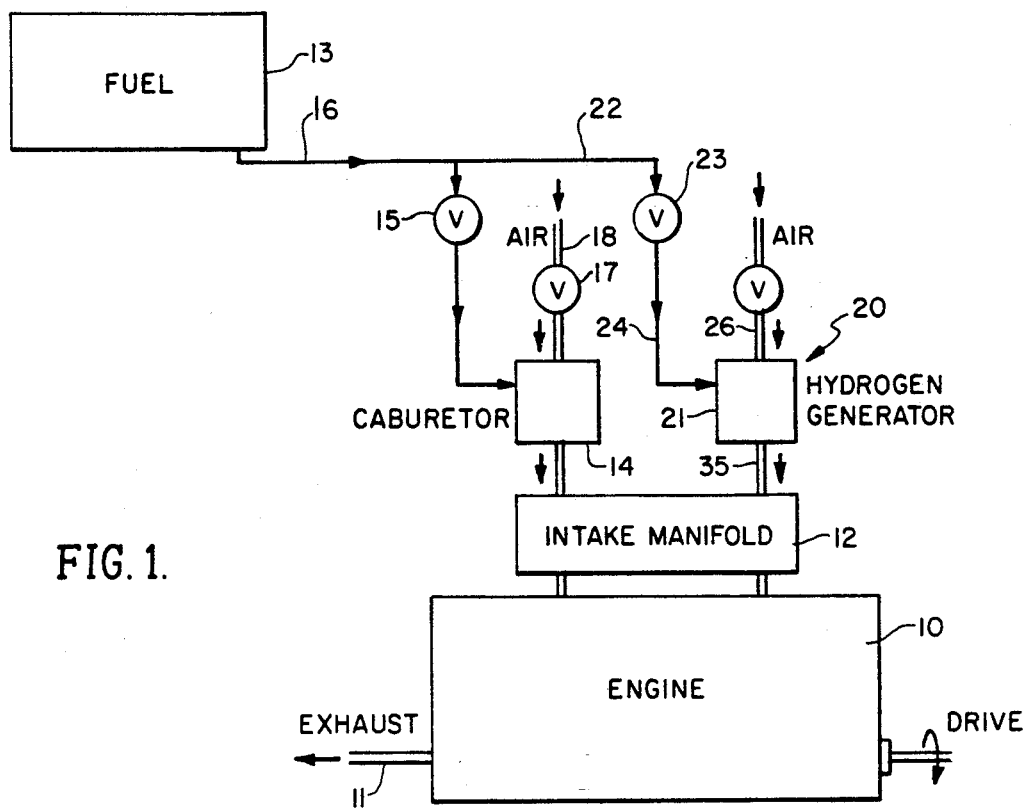
FIG. 1 is a schematic drawing of a combustion engine incorporating the novel hydrogen generation means of the present invention effective to reduce nitrogen oxide in the engine emissions.

Referring to FIG. 1, a schematic illustration is presented wherein numeral 10 represents a conventional combustion engine having an exhaust 11 which normally emits gases having a high level of nitrogen oxide, as well as other contaminants. However, by employment of the present invention, these contaminants are greatly reduced or eliminated. The engine 10 includes a manifold 12 into which engine fuel from a storage tank 13 is introduced to the engine main combustion chamber. The fuel contained within tank 13 is mainly introduced to the manifold 12 through a carburetor 14 via a regulating valve 15 connected to a main fuel line 16. Ambient air is introduced to the carburetor for mixture with the main fuel supply via a valve 17 and an air inlet 18. Thus, it can be seen that the combustion engine 10 is employed with fuel from tank 13 via the carburetor 14 wherein the main fuel supply is mixed with air according to a proper ratio to permit efficient combustion in the engine 10.

However, the conventional system described is enhanced by utilization of the novel burner apparatus of the present invention, indicated in the general direction of arrow 20 which may be referred to as a hydrogen generator for supplying a hydrogen vapor to the manifold 12 in order to reduce or eliminate nitrogen oxide in the combustion engine exhaust. It can be seen in FIG. 1 that the hydrogen generator, indicated by numeral 21, is supplied with a portion of the main fuel supply by means of a bypass line 22 connected to main line 16, and which is coupled to the hydrogen generator 21 through a valve 23. Line 24 connects the valve 23 with the generator 21.

Figure 2:
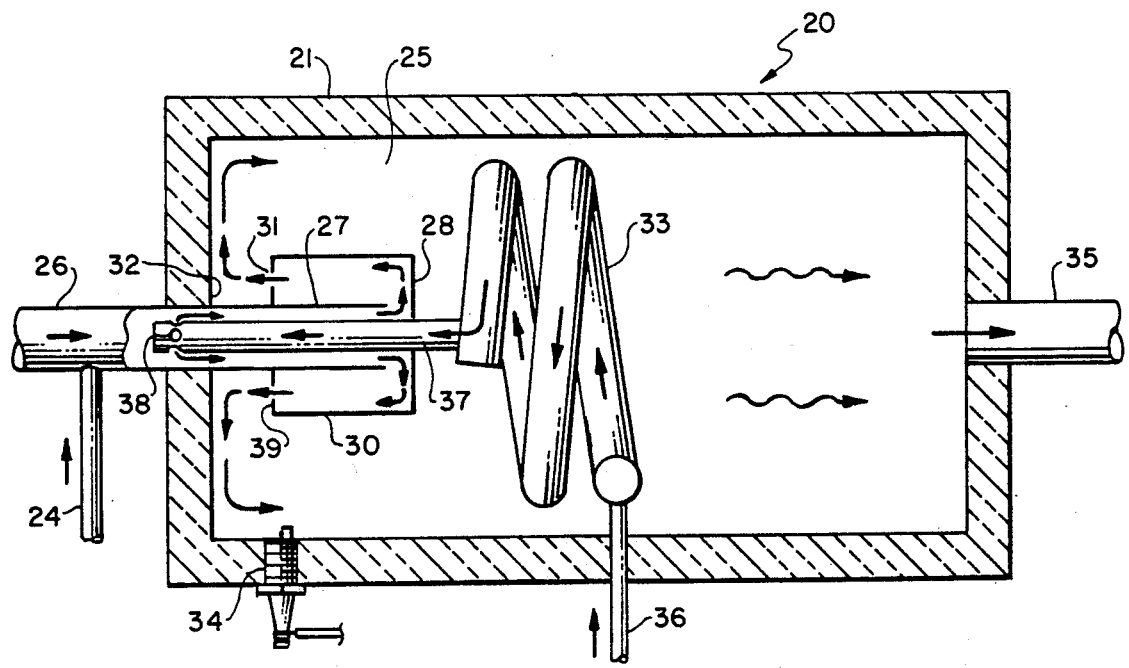
FIG. 2 is an enlarged diagrammatic view in section illustrating the novel burner means employed in the engine system shown in FIG. 1 for hydrogen generation.
Figure 7:
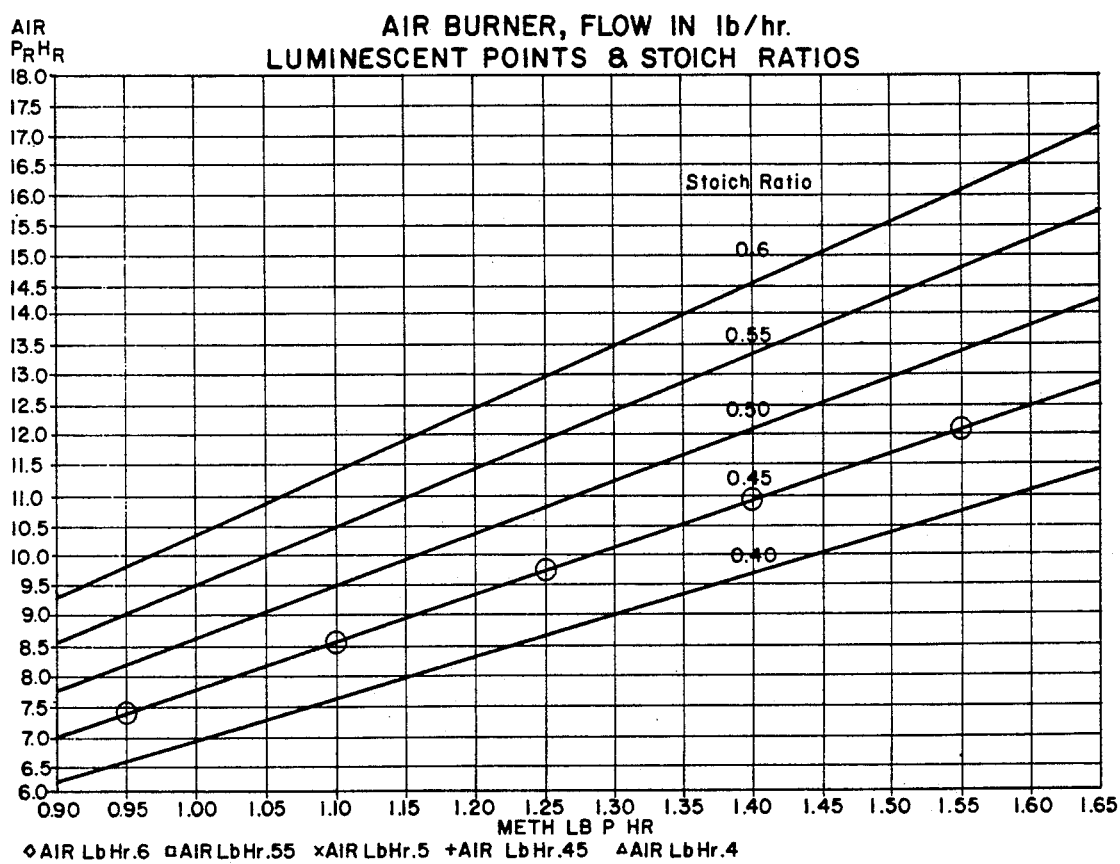
FIG. 7 is a chart including experimental points for a methane-air burner where luminescent carbon appears.

Referring now in detail to FIG. 2, the hydrogen generator 21 includes a housing having an internal combustion chamber 25 in which the hydrogen generating means are located. When the main fuel is a gas, such as methane, a portion of the gas is introduced via line 24 in combination with air supplied via line 26 so that the gas/air is initially combined in a tube 27 within the combustion chamber 25. The tube 27 is open-ended so that the combined gas/air is directed towards a baffle 28 carried on the end of a cup 30. The combined gas/air impinges against the baffle 28, as indicated by the flow of arrows such that the flow is reversed upon itself and exits through the open end of the cup 30, indicated by numeral 31. The two streams of air and gas move together through the tube 27 so as to finally exit inside the cup 30 where the streams impinge on the baffle 28. This causes flow direction changes, first 90 degrees radially outward and then 90 degrees to the opening 31. This process induces mixture of the air and gas. The reversed flow exits the cup at the orifice or opening 31 and immediately impinges on the end of the burn wall, indicated by numeral 32, serving as a second baffle where the flow is again abruptly caused to move at successive right angles producing further mixing. The thoroughly mixed gas and air is now within the combustion chamber 25 wherein ignition of the mixed gases by gases already burning in the burner combustion chamber takes place. The initial ignition of the first entry of unignited gases occurs upon operation of a spark plug 34 having its electrodes within the combustion chamber 25. The flame continues through the burner and finally exits at a discharge duct 35 from which it is introduced to the combustion chamber of the engine 10.

In another instance, when the main fuel is a liquid, such as gasoline, the fuel is introduced through a line 36 and moves through the heat exchanger coils 33. Heat from the burning gases is properly exchanged to the liquid fuel causing it to vaporize. The latter vaporized gases then pass through a tube 37 eventually being conducted through openings, such as opening 38, where the gases meet oncoming air in the line 26 with resultant consequences as described immediately above.

Because normal burners have an excess of very reactive air, it is no real chore to bring about efficient reaction. The inventive burner has a deficiency of air, so its reaction occurs in two steps. The first is oxidation of part of the fuel with all the oxygen present, which occurs with good efficiency because of the intrinsic reactivity of oxygen. The second is decomposition of the unreacted excess fuel on absorbing heat provided from the oxidation reaction. Since fuels are inherently stable, thermal decomposition to equilibrium products is difficult to achieve. Instead, it generally leads to partially decomposed fuel fragments, including some original fuel. This does not provide the theoretical equilibrium products which are needed.

The inventive concept shows that equilibration in excess-fuel burners is achieved if the air and fuel are very homogeneously mixed prior to ignition. Apparently, within this intimate mixture, heat supplied from oxidation of part of the fuel is simultaneously absorbed by unreacted fuel in immediate contact, which then do decompose to equilibrium products.

This intimate premixing is achieved by bringing the air and fuel together in a separate chamber, where the flow is made to move back and forth. This intimate mixture then enters the combustion chamber wherein ignition occurs. It is necessary that burning does not travel back into the mixing chamber, despite the burning gases at their exit, which normally is an excellent ignition source.

This is prevented by the velocity of the stream that leaves the mixing chamber, taking advantage of the fact that the rate of burning through a mixture of fuel and air occurs at a finite rate. Thus, if the burning rate is 1 ft./sec., then the gas mixture exiting the mixing chamber must travel at a higher rate. Otherwise, the burning gases in the burner would cause a burning lamina to travel back into the mixing chamber, which would be destructive.

The dimension of the burner 21 in inches used is:

| | |
|---|---|
| I.D. Insulated Burner 21 | 5.375 |
| Diameter of Cup 30 | 1 |
| Height of Cup 30 | 1 |
| Distance between Cup 30 and Rear Wall 32 | 0.875 |
| Diameter Tube 26 | 0.5 |
| Distance from end of Tube 26 and Bottom 28 of Cup 30 | 0.75 |
| No Annulus or other hardware added to Orifice 31 | |

From the above, the annulus that sets the flow from mixing chamber into burner chamber has O.D. of 1.0 and I.D. of 0.5, so its area, A, is 0.59 in$^2$ or 0.0041 ft$^2$. Fuel was gaseous methane, so a prevaporizing assembly was not used. Oxidizer was laboratory air taken from compressor at maximum pressure of 50 psig.

The linear flow, LF, in ft. at the annulus was estimated from the air flow, AF, and fuel flow, FF, both in standard cubic feet per hour (SCFH) at the temperature and pressure, and the area, A, using, $$LF = (AF + FF)/(A \times 3600).$$

Flow data from the tests at minimum and maximum flows, and as derived therefrom are in the following table:

| | Flow Rates | | | |
|---|---|---|---|---|
| | ft$^3$hr | | | ft/sec |
| Test | FF | AF | Total | LF |
| Min | 20.75 | 105.2 | 126.0 | 8.53 |
| Max | 39.2 | 219.1 | 258.3 | 17.5 |

Linear burning rates for air-fuel mixtures can be found in standard engineering texts, such as the "Chemical Engineers'Handbook", John H. Perry, Editor (1963). These vary from about 1 ft/sec for most fuels to maximum of about 8 for hydrogen.

The linear burning rates in the table always exceed the linear burning velocity of the air-fuel mixture, so flash back burning into the mixing hardware was not likely, and it was not found. Had problems occurred due to too low a gas velocity, which could not be solved by other means, a fine metal screen 39 would have been attached over the annulus. Experience has shown this to prevent flashback at rates about ⅛ the actual linear burning rate due to a radical-trapping effect that inhibits ignition.

FACTORS CONTRIBUTING TO NOX FORMATION

FIG. 3 is constructed from data calculated by the chemical equilibrium program for reaction between methane (CH$_4$) and air (2+4N$_2$), $$CH_4 + 2n(O_2 + 4N_2),\qquad(1a)$$

where n is stoichiometric ratio. At n=1, the air contains just sufficient oxygen to react with all carbon and hydrogen atoms, producing carbon dioxide (CO$_2$) and water (H$_2$O) in the ratio, $$CO_2 + H_2O.\qquad(1b)$$

The lower curve of FIG. 3 is volume percent NOx in the combustion mix, the upper curve is equilibrium reaction temperature in ° F. (divided by 10$^4$ to fit the ordinate), and the slant line from the origin is air/fuel ratio by weight (divided by 100).

Results show that temperature and excess air effect the formation of NOx, which peaks just beyond the stoichiometric ratio of 1, where the air/fuel ratio is about 12. This is near the conditions where many engine combustors operate. At stoichiometric ratios greater than two, NOx is substantially diminished, as temperature drastically decreases. The air/fuel ratio is about 20 or greater. Practical experience has shown that methane combusts poorly at the latter high air-fuel ratios where NOx is low, and that this can be remedied by adding an appropriate amount of hydrogen.

HYDROGEN PRODUCTION USING A BURNER

Two means of producing hydrogen from fuels generally using a burner are discussed below. The hydrogen so produced would be co-injected into the engine combustion chamber with the remainder of the fuel.

1. Hydrogen Produced by Thermal Decomposition of Methane

The CH$_4$ molecule contains, in effect, two moles of hydrogen per atom of carbon, so the fuel is a candidate as hydrogen source. On the other hand, its hydrogen content is only 25% by weight, with the remaining 75% being solid carbon. Complete reaction is, $$CH_4 = C(2) + 2H_2.\qquad(2)$$

FIG. 4 has equilibrium data on the above reaction at various temperatures, calculated with the theoretical program. In this analysis, only methane (CH$_4$), solid carbon (C(s)(, and hydrogen were included.

above 700° F., notable dissociation occurs, approaching 50% at 1000° and 100% at 1500° F. Each mole of hydrogen is accompanied by 0.5 moles of carbon.

Experience shows that dissociation approaching equilibration requires the fuel pass through special catalysts while being heated, which represents an engineering complexity.

Energy input is required to heat the methane and effect dissociation at the given conditions. Such data are in the curve labeled kWT-hr/lb. To refer this to an automobile, preliminary assumptions were made of 20 miles/6 lb. of methane (at, say, 60 mph) and need for 10% by volume of hydrogen to improve engine emissions. Results for these conditions are in the curve labeled kWt (multiplied by 10 to fit the ordinate.) As an example, if decomposition by heating to 1000° F. is called for, where one mole of methane converts to one of hydrogen, there is a continuous need for 0.016 kW thermal, or 16 watts.

If the latter energy is supplied electrically from the auto alternator, various inefficiencies would result in a 6-fold drain to the engine or about 100 watts, if the energy is from a battery recharged by the engine. This energy would add to the other electrical needs of the engine and heat transfer from electrical heaters is difficult to carry out.

Energy for the process may be supplied by a separate burner, as in Greiner, U.S. Pat. No. 4,350,133. Here, energy from hot burner gases produced by burning some of the fuel is used to heat another portion of fuel in a separate heat exchanger to decomposition temperature, and the gases from the exchanger then passed to the engine. The spent burner gases are exhausted, resulting in energy losses resembling those discussed above. The patent was intended for use with methanol as fuel, which can uniquely decompose without formation of solid carbon "soot".

The formation of carbon by dissociation of all fuels which are not methanol results in severe handicaps. Most important, as a solid carbon can severely clog various engine parts. Also as a solid, it is difficult to burn which reduces the energy output of the engine.

The overall conclusion is that formation of hydrogen by thermal dissociation of fuels for subsequent injection into an engine is fraught with problems. These are overcome by the alternative method of producing hydrogen by reaction of fuel in a burner at sub-stoichiometric at/fuel ratio, as next discussed.

2. Hydrogen Produced by Sub-Stoichiometric Air/Fuel Reaction

Further information on major species theoretically formed in a burner at equilibrium vs. stoichiometric ratio is given in FIGURES 5 and 6. (Nitrogen and oxygen are not shown since they are not important to the analysis and their high concentrations overpower those of the other species.) FIGURE 6 amplifies the data below a ratio of 1. Note that above a ratio of about 0.4, about 1.55 moles of hydrogen form per mole of methane, while carbon does not form. This suggests that if a combustion technique could be developed to attain this equilibrium, it would not require an external heat input, catalysts or special heat exchange means, and all its combustion products could pass into the engine to minimize thermal energy losses.

EXPERIMENTAL RESULTS

The ability of the instant burner to attain theoretical equilibration at sub-stoichiometric ratios required to attain the process goals of no carbon was experimentally ascertained by operating the burner whose design and dimensions have previously been given, using methane as fuel. Visual observations were made of the sudden disappearance and reappearance of incandescent carbon as the actual stoichiometric ratios are also drawn on the Figure. The points all fall on the line for stoichiometric ratio of 0.45, which is where theory predicts formation of carbon. Conservation of mass requires that the remaining species, including hydrogen, essentially also follow the theoretical predictions.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In an internal combustion apparatus, the improvement which comprises:
    a burner means for combusting air and hydrocarbons at fuel-rich stoichiometric air/fuel ratios from 0.3 to 1 to provide air/fuel vapors; and
    said burner means includes a mixer means intimately combining said air/fuel vapors for injection into said internal combustion apparatus;
    means for preventing flame flash back into said air/fuel mixer means;
    said burner includes a combustion chamber having an inlet means for receiving separate supply of fuel and air; and
    said mixer means includes a baffle assembly disposed in said burner means combustion chamber for receiving said combined air/fuel supply in forced impingement relationship to create a mixed vapor;
    said baffle assembly includes a cup-like member having a wall adapted to interfere with flow of said combined air/fuel mixture to blend said mixture and redirect the flow; and
    said burner means having a back wall for receiving said redirected mixture flow adapted to further blend said air/fuel mixture.

2. The invention as defined in claim 1 wherein:
    said baffle assembly includes spaced-apart walls having a first wall adapted to receive impinging blended main fuel portion and air portion to provide flow reversal to a second wall spaced from said first wall operable to receive and redirect said blended main fuel portion and air portion to produce a thorough mixture of said fuel/air flow.

3. The invention as defined in claim 2 wherein:
    said inlet means is connected to a source of gaseous fuel.

4. The invention as defined in claim 1 including:
    said burner means having an ignition means adjacent to said mixer means for selectively igniting said air/fuel mixture.

5. The invention as defined in claim 1 including:
    heat exchanger means disposed in said burner means combustion chamber for vaporizing liquid fuel;
    a source of liquid fuel operably connected to said heat exchanger means.

6. Apparatus for reducing nitrogen oxide contaminants emitted from an internal combustion power source comprising:
    a main fuel supply;
    an air supply;
    a burner means operably coupled to said fuel supply and said air supply for receiving a portion of said main fuel and air commingled within said burner means;

mixer means carried in said burner for thoroughly combining said fuel and said air together to form a blend;

ignition means secured to said burner means for igniting said fuel/air blend for discharge into said internal combustion power source;

said mixer means includes spaced-apart walls having a first wall adapted to receive said blended main fuel portion and said air portion to provide flow reversal to a second wall for receiving and redirecting said blended main fuel portion and said air portion to produce a thorough mixture of said fuel/air flow;

a source of liquid fuel; and heat exchanger means disposed in said burner means for receiving and vaporizing said liquid fuel.

7. The invention as defined in claim 6 including:
means in said burner means to prevent ignition of said air/fuel mixture in said mixer means.

8. The invention as defined in claim 6 including:
means in said mixer means for inducing sudden right angle flow reversals of said fuel/air mixture.

9. Apparatus for reducing nitrogen oxide contaminants emitted from an internal combustion power source comprising:

a main fuel supply;

an air supply;

a burner means operably coupled to said fuel supply and said air supply for receiving a portion of said main fuel and air commingled within said burner means;

mixer means carried in said burner for thoroughly combining said fuel and said air together to form a blend;

a baffle assembly included in said mixer means having a wall adapted to interfere with flow of said combined air/fuel mixture to blend said mixture and redirect the flow to said burner means; and said burner means having a back wall for receiving said redirected flow to further blend said air/fuel mixture;

said burner means having a back wall for receiving said redirected flow to further blend said air/fuel mixture; and ignition means secured to said burner means for igniting said fuel/air blend for discharge into said internal combustion power source.

10. A method of reducing NOx contaminants in an internal combustion power source comprising the steps of:

withdrawing a portion of fuel from a main fuel source;

introducing a quantity of air with said portion of fuel to produce an air/fuel flow;

conducting said air/fuel flow into a mixing assembly by forcibly urging said air/fuel flow into engagement with walls causing flow reversal and thorough mixing of air and fuel to produce a combustible vapor;

igniting said combustible vapor in a burner chamber to produce combustion products;

exhausting said combustion products from the burner into the combustion power source for mixing with main fuel;

introducing air and fuel portion vapors into the mixing assembly for pre-heating wherein said vapors are produced in a heat exchanger converting liquid fuel into said vapors;

preventing flash back ignition of said air/fuel mixture in the mixing assembly.

* * * * *